United States Patent [19]

Allum et al.

[11] Patent Number: 5,508,095
[45] Date of Patent: Apr. 16, 1996

[54] PAPERMACHINE CLOTHING

[75] Inventors: Andrew Allum, Darwen; Ian C. Sayers, Ribchester; Thomas Saunders, Blackburn, all of United Kingdom

[73] Assignee: Scapa Group PLC, Lancashire, United Kingdom

[21] Appl. No.: 333,331

[22] Filed: Nov. 2, 1994

[30] Foreign Application Priority Data

Nov. 16, 1993 [GB] United Kingdom ............... 9323620
Jul. 26, 1994 [GB] United Kingdom ............... 9414969

[51] Int. Cl.⁶ ........................................... B32B 5/16
[52] U.S. Cl. ............... 428/242; 139/383 A; 428/224; 428/240; 428/262; 428/281; 428/283; 428/421; 428/225
[58] Field of Search ...................... 428/168, 224, 428/240, 242, 283, 281, 225, 421, 262; 139/383 A

[56] References Cited

U.S. PATENT DOCUMENTS

| 4,382,987 | 5/1983 | Smart | 428/300 |
| 4,565,735 | 1/1986 | Murka et al. | 428/300 |
| 4,569,883 | 2/1986 | Renjilian | 428/283 |
| 4,571,359 | 2/1986 | Dutt | 428/283 |
| 4,981,745 | 1/1991 | Lefkowitz | 428/283 |
| 5,164,251 | 11/1992 | Darrs et al. | 428/300 |
| 5,316,833 | 5/1994 | Davis et al. | 428/225 |

FOREIGN PATENT DOCUMENTS

| 0187967 | 12/1985 | European Pat. Off. . |
| 0342171 | 2/1989 | European Pat. Off. . |
| 883905 | 12/1961 | United Kingdom . |
| 1090877 | 11/1967 | United Kingdom . |

*Primary Examiner*—James J. Bell
*Attorney, Agent, or Firm*—Keck, Mahin & Cate

[57] ABSTRACT

Papermachine clothing made from a sheet of partially fused polymeric particles and having a reinforcing structure embedded wholly within the sheet.

21 Claims, No Drawings

PAPERMACHINE CLOTHING

The present invention relates to papermachine clothing comprising partially fused particles.

A suitable particulate material can be partially fused by means of a high energy input to give a structure containing a multitude of interstices. When heated above their crystalline melting point, the particles do not fluidise, but adopt a viscoelastic form. The external shape of the individual particles is substantially retained so as to provide an array of contiguously dispersed neighbouring particles. Usually for the successful partial fusion of polymers ultra high molecular weight materials (UHMW) must be used, a typical molecular weight being 3 to $9 \times 10^6$ g/mol. However, some materials such as polyurethane and thermoplastic polyurethane do not need to possess an ultra high molecular weight for successful partial fusion.

EP 0187967 describes papermachine clothing comprising a base cloth having a coating of a sintered product on one side thereof. The sintered product does not cover both sides of the base fabric. The base fabric is thus finely engineered so as to avoid marking of the paper. Such fabrics are made using long and arduous preparation techniques.

According to the present invention there is provided papermachine clothing made from partially fused particles, but optionally comprising a reinforcing structure embedded wholly within the papermachine clothing.

The fabrics of the invention can be made much more quickly than those made by the method of EP 0187967 and are thus relatively cheap to manufacture.

The particles are preferably polymeric, although other materials such as metals may be used.

This partially fused material exhibits greatly enhanced abrasion resistance. The machine side of the material may be grooved to increase the hydraulic differential between the paper face of the fabric and the press roll and to aid installment of the fabric on the machine where the papermachine suction box surfaces are grooved.

Preferred polymers for partial particle fusion include polyalkenes such as polyethylene and polypropylene, polyurethane, thermoplastic polyurethane or EPDM (ethylene propylene diene monomer). One example polymer is the Hostalon GUR (trade mark of Hoechst AG) range of HUMW polyethylene having a molecular weight of 3.2 to $8 \times 10^6$ g/mol. Another example is the Goodrich product 58810 (TM) which has a shore hardness of 90.

A sheet of partially fused polymer may be prepared by evenly spreading the polymer powder into a layer of uniform thickness of typically 3 to 4mm and then heating the polymer. The uniform polymer layer may be obtained by using a roller or blade. Alternatively the polymer powder may be moulded to the desired thickness. The layer of polymer is heated to say 230° C. to 240° C. for a time period in the order of 1.9 mins per mm of sheet thickness, allowing for shrinkage due to partial fusion forces. Continuous sheet production may involve distributing the powdered polymer onto a tensioned metal belt which passes through an oven where the belt is heated from above and underneath by IR heaters to facilitate partial fusion. The finished product may be mechanically treated, e.g. by grinding to give a smooth finish.

Some materials such as thermoplastic polyurethanes on being subjected to a high energy input partially fluidise and partially adopt a viscoelastic form as previously described so as to provide a partially fused product having superior toughness.

Other materials do not fluidise to a significant extent. Such sheets of solely partially fused polymeric particles will have only one drawback in that each polymer particle is only bonded at its tangent. The force required to break these bonds will not be particularly great and therefore a partially fused sheet will readily shed polymeric particles when subjected to frictional or impact forces. A reinforcement structure may be embedded wholly within such materials. This may comprise fibres extending through the partially fused product. Alternatively the reinforcement may comprise a fabric such as a nonwoven fabric, a mesh fabric, a plain weave fabric or a random dispersion of chopped fibres.

Bonding or bicomponent fibres are preferred, the melting or softening point of which is greater than that of the polymeric particles. On a macro scale the fibres may be formed into yarns. The yarns may form a woven or nonwoven matrix.

An example bicomponent fibre is Danaklon ES-C (trade mark) which comprises a polyethylene core and a polypropylene sheath. The fibre has a high adhesion strength and a low bonding temperature of 135° to 145° C. An example bonding fibre is Dacron 134 (trade mark of DuPont) which is a polyethylene terephthalate fibre with a melting/softening point of 205° C. One particularly suitable fibre is polyamide 6, having a melting point of 235° C. A sheath core bicomponent fibre with a polyamide 6 sheath and polyamide 6:6 core may also be appropriate.

The permeability of the partially fused product may be improved by incorporating a blowing agent into the product during partial particle fusion or using a porous support medium (e.g. partially fused metal) to enable the partially fusible powder to be fluidised immediately prior to melt bonding.

The particles may be layered in different size fractions to produce a pyramidal porosity profile and, therefore, a permeability gradient. The partially fused sheet may be coated with fluoropolymers to give an improved wipe-clean, hydrophobic surface particularly advantageous for preventing re-wet of papermachine clothing and reducing fabric contamination. An ormocer (organically modified ceramic) coating would confer significant abrasion resistance, with back-flushing of air being employed at the point of lick-up during coating application to ensure the permeability of the structure is maintained.

A hybrid needled felt/partially fused particle surface may be formed by partially embedding polymer particles in the fibrous surface to act as a foundation for the final partially fused layer.

A further advantage of this method is the ease of addition of pigments, for example, a marking such as a bar may be incorporated to aid alignment of fabrics on machines and a logo can easily be incorporated.

We claim:

1. Papermachine clothing consisting essentially of partially fused particles, and a reinforcing structure embedded wholly within the papermachine clothing.

2. Papermachine clothing as claimed in claim 1, wherein said particles are polymeric particles.

3. Papermachine clothing as claimed in claim 1, wherein the particles comprise a member selected from the group consisting of polyalkene, polyurethane and EPDM.

4. Papermachine clothing as claimed in claim 1, wherein said particles comprise a metal.

5. Papermachine clothing as claimed in claim 1, wherein the papermachine clothing has two sides and a machine side of the clothing comprises grooves.

6. Papermachine clothing as claimed in claim 1, wherein the reinforcing structure comprises fibres extending through a mass of the partially fused particles.

7. Papermachine clothing as claimed in claim 1, wherein the reinforcing structure comprises a nonwoven fabric of said fibres.

8. Papermachine clothing, as claimed in claim 1, wherein the reinforcing structure comprises a random dispersion of chopped fibres.

9. Papermachine clothing as claimed in claim 1, wherein the reinforcing structure comprises fibres having a melting or softening point which is greater than that of said partially fused particles.

10. Papermachine clothing as claimed in claim 1, wherein the reinforcing structure comprises bonding or bicomponent fibres.

11. Papermachine clothing as claimed in claim 1, wherein the partially fused particles are layered in different size fractions.

12. Papermachine clothing as claimed in claim 1, having a fluoropolymer coating applied on said papermachine clothing.

13. Papermachine clothing as claimed in claim 1, having an ormocer coating applied on said papermachine clothing.

14. Papermachine clothing consisting essentially of partially fused particles.

15. Papermachine clothing as claimed in claim 14, wherein said particles are polymeric particles.

16. Papermachine clothing as claimed in claim 14, wherein the particles comprise a member selected from the group consisting of polyalkene, polyurethane and EPDM.

17. Papermachine clothing as claimed in claim 14, wherein said particles comprise metal.

18. Papermachine clothing as claimed in claim 14, wherein the papermachine clothing has two sides and a machine side of the clothing comprises grooves.

19. Papermachine clothing as claimed in claim 14, wherein the partially fused particles are layered in different size fractions.

20. Papermachine clothing as claimed in claim 14, having a fluoropolymer coating applied on said papermachine clothing.

21. Papermachine clothing as claimed in claim 14, having an ormocer coating applied on said papermachine clothing.

* * * * *